United States Patent [19]
von Borstel et al.

[11] Patent Number: 5,115,446
[45] Date of Patent: May 19, 1992

[54] DEVICE FOR A POWER LASER

[75] Inventors: Michael von Borstel; Heinz-Jurgen Prokop, both of Stuttgart; Reinhard Wollerman-Windgasse, Vaihingen/Enz-Riet, all of Fed. Rep. of Germany

[73] Assignee: Trumpf Lasertechnik GmbH, Ditzingen, Fed. Rep. of Germany

[21] Appl. No.: 584,703

[22] Filed: Sep. 19, 1990

[51] Int. Cl.⁵ .............................................. H01S 3/081
[52] U.S. Cl. ..................................... 372/93; 372/94; 372/97; 372/107; 372/55; 372/58
[58] Field of Search ...................... 372/55, 58, 92, 93, 372/94, 97, 107

[56] References Cited

U.S. PATENT DOCUMENTS

| | | | |
|---|---|---|---|
| 4,035,081 | 7/1977 | Sepp | 372/94 X |
| 4,907,240 | 3/1990 | Klingel | 372/58 |
| 4,912,718 | 3/1990 | Klingel | 372/58 |
| 4,993,040 | 2/1991 | Esskuchen | 372/94 |

Primary Examiner—Georgia Epps

[57] ABSTRACT

A carrying structure for the flanges and other elements of two laser beam paths has a geometric central plane zone that lies between and parallel to geometric central plane zones of the two laser beam paths so that the carrying structure includes the flanges of the first and second laser beam paths, is common to at least two laser segments, and that the first central plane zone of the first laser segment is disposed parallel to the second central plane zone of the second laser segment.

21 Claims, 8 Drawing Sheets

DEVICE FOR A POWER LASER

The invention relates to a longitudinal flow $CO_2$ laser.

BACKGROUND OF THE INVENTION

Such a device is known, for example, from U.S. Pat. No. 4,912,718, the disclosure of which is incorporated herein by reference. In this case, the space is well utilized in terms of design, since the concept of using modules has been adopted to a very great extent.

The object of the invention is to provide on an even smaller surface a laser device with which the surface utilization can be improved, for example, by a factor or two. According to, for example, FIG. 5 of the U.S. Patent, there are two laser beam paths 14, 14'. The laser paths are arranged in a square. It is also possible to see, in the U.S. Patent, a series of continuous flanges 26, 31, 33, 36, 26', 31', 33', 36'. Intermediate corner flanges 16, 18, 16', 17', 18' are also visible. There is also an end flange 21. In said patent the carrying structure is, in the illustrative embodiment, a table 12. In this case, the flanges are arranged on the carrying structure. It is also possible to see inlet and outlet lines 66, 84, 87, 79, 88, 81, 89 arranged in a star configuration.

According to a further modification shown in FIG. 11 of the U.S. Patent two structural laser units are arranged on two levels, one in a head-down position disposed on top of the other. Since each of the units comprises at least one laser module or a plurality of modules and since each module comprises its own carrying structure, such doubling of modules means significant expenditure in material and costs, as well as on room. Furthermore, the dimensions of each individual carrying structure may vary under the influence of temperature changes quite differently from the other so that the effective length of the individual laser beam paths may change in different amounts. As a result, it is difficult to stabilize the effective resonant length especially when such beam paths have to be serially coupled.

The object according to the invention is achieved in a $CO_2$ laser having the following features:

The longitudinal-flow $CO_2$ laser, has a first and second laser beam path, each beam path having intermediate corner flanges with deflecting mirrors for folding the beam path in at least three partial segments. Each beam path is associated with a respective first and second geometric central plane zone. The $CO_2$ laser has one end flange with a totally reflecting mirror and an output mirror and a carrying structure for supporting the flanges. The carrying structure is associated with a third geometric central plane zone disposed between the first and second plane zones and parallel thereto, so that the carrying structure is common to the flanges of the first and second laser beam path.

Because of the common carrying structure, both beam paths change their lengths equally as far as such change may occur. Also, because of the position of the carrying structure between both beam paths differences in heat properties of the beam paths are well balanced. And in that one carrying structure supports two beam path elements (flanges with inlet and outlet lines for gas circulation) the complete construction is more compact and saves material and weight.

DESCRIPTION OF THE DRAWINGS

The invention will be described with reference to preferred illustrative embodiments.

In the drawing.

DETAILED DESCRIPTION OF PREFERRED EMBODIMENTS

Figure 1:
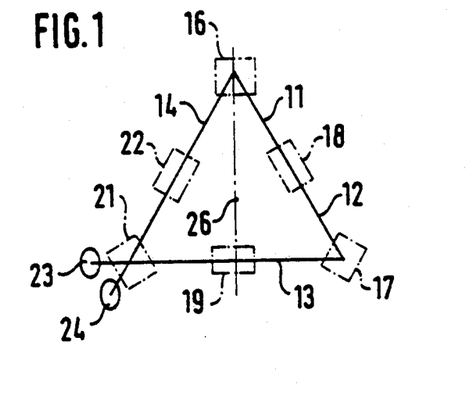
FIG. 1 shows a diagrammatic plan view on a laser beam path in the form of an equilateral triangle, the flanges being shown in broken lines.

According to FIG. 1, a laser beam path 11 has three partial segments 12, 13, 14, which are of equal length, for which reason an equilateral triangle is formed, the internal angles of which are in each instance 60 degrees. The partial segment 12 extends from an intermediate corner flange 16 to an intermediate corner flange 17, through a continuous flange 18. The partial segment 13 extends from the intermediate corder flange 17 through a continuous flange 19 to an end flange 21. The partial segment 14 is situated between intermediate corner flange 16 and end flange 21 and passes through a continuous flange 22. The mirror 23 for total reflection, which mirror is shown in outline there for the sake of clarity, and a coupling-out mirror 24 are situated in the end flange 21. Thus, we distinguish between the laser beam path 11 and its partial segments 12-14, which extend between mirrors.

At intermediate corner flanges 16 and 17 the partial segments are deflected in each instance by 60 degrees. The laser beam path 11 is situated in the plane of the drawing of FIG. 1. A point of intersection 26 of the angle bisectors is the position of passage of a geometrically defined axis along which further components are directed, such as, for example, the axis about which the rotor of a fan which has not yet been explained rotates.

The partial segments 12-14 in FIG. 1 are parts of the laser beam. This is also true for the partial segments in FIG. 7. It is well known that laser beams are excited in gas pipes (e.g. 27 in U.S. Pat. No. 4,972,718), but for the sake of clarity throughout in the present specification, such gas pipes are not shown.

The corner flanges and continuous flanges serve as fittings for the gas pipes and usually (as explained in U.S. Pat. No. 4,972,718) fresh cooled gas is supplied via the corner flanges and the heated gas is sucked off via the intermediate continuous flanges. The corner flanges, additionally, serve as supporting installation for the several mirrors for deflecting the laser beam.

Figure 2:
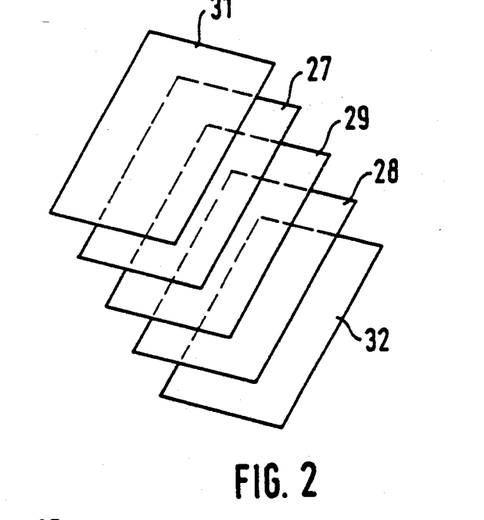
FIG. 2 shows a three-dimensional representation of five planes, which play a part in the invention in association with a central symmetry.

FIG. 2 shown is a certain sequence of a sandwich of beam paths and a carrying structure. The first and second plane zones 27, 28 are synonymous for the first and second beam paths and the third plane zone 29 is synonymous for the carrying structure. It makes sense to show these several planes in FIG. 2. The main attempt of this figure, of course, is not to show how planes can be arranged but to correlate these planes with reference numerals to which later portions of the specification refer. It should be noted that it is somewhat difficult to draw three or more plane zones in one of the other FIGS. 5 to 14 without confusion.

According to FIG. 2, there is a first central plane 27, a second central plane 28 and a third central plane 29. Central planes 27 and 28 are parallel to central plane 29 and are equally far distant from central plane 29. Above central plane 27 there is situated a fourth central plane 31, and below central plane 28 a fifth central plane 32. The third central plane 29 centrally intersects a carrying structure which has yet to be discussed. This carrying structure carries two laser beam paths 33, 34 (FIG. 5)—or alternatively two laser beam paths 11 or other forms of laser beam paths— which are situated in each of the central planes 27, 28.

The central planes 31, 32 centrally intersect inlet lines and return lines for the laser gas, which have yet to be discussed and which are arranged in a star configuration and which lead to a fan and away from it. In this arrangement, the star in conjunction with associated connecting lines of the fourth central plane 31 supplies the laser beam path situated in the central plane 27. The situated in the fifth central plane 32 supplies the laser beam path situated in the central plane 28, by means of connecting lines.

Figure 3:
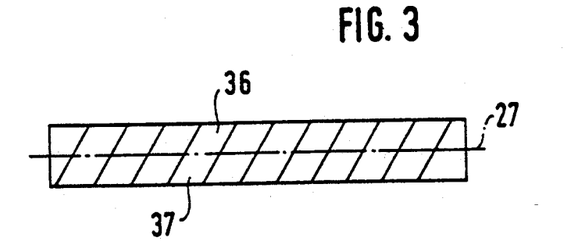
FIG. 3 shows a diagrammatic representation to explain the term "zone"

In FIG. 3 one central plane, for example the first central plane 27, has been picked out. Above this plane is a zone 36, and below this plane is a zone 37. All elements situated within these zones 36, 37 will be defined as being located substantially in the respective central plane, thus the central plane 27 does not need to be precisely defined in mathematical terms.

Figure 4:
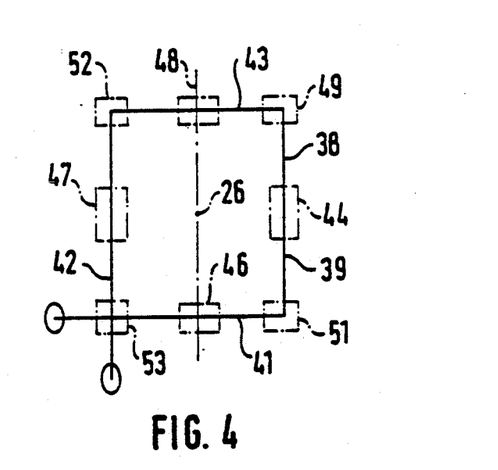
FIG. 4 shows a view, similar to FIG. 1, for a square laser beam path.

According to FIG. 4, there is a square laser beam path 38. The partial segments 39, 41, 42, 43 are of equal length and stand perpendicular to one another. They extend through continuous flanges 44, 46, 47, 48, are deflected through 90 degrees in intermediate corner flanges 49, 51, 52, and in the end flange 53 are on the one hand reflected and on the other hand coupled out in known manner. There may be situated in each instance in the central planes 27 and 28 an individual laser beam path, the flanges of which are individually supplied with gas by a star configuration of connecting lines. In this case, one partial star is cut in the plane 31 and the other partial star from the plane 32. In this case, the intermediate corner flanges exhibiting deflecting mirrors are in principle connected to the inlet lines for cooled gas, just like the end flanges. The individual stars with their return lines draw the heated gas away from the continuous flanges.

Figure 5:
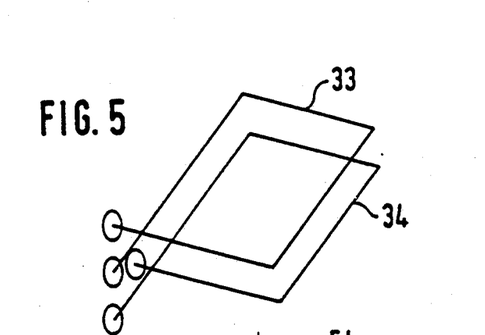
FIG. 5 shows a diagrammatic three-dimensional representation of two mutually superposed, elongate-rectangular laser beam paths.

FIG. 5 shows a rectangular beam path laser 33 in the central plane 27 according to FIG. 2 and a laser beam path 34 which is situated in the central plane 28 according to FIG. 2. There are here two separate laser beam paths, each with an intermediate coupling-out mirror and a totally reflecting mirror.

Figure 6:
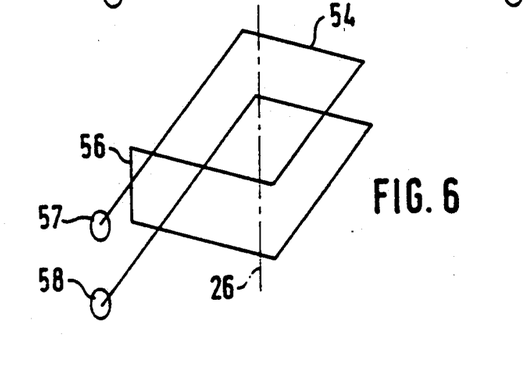
FIG. 6 shows a view, in accordance with FIG. 5, in which, however, the two laser paths have been combined into a single laser beam.

FIG. 6 shows the coupling of two such laser beam paths which are situated in the central planes 27, 28, according to FIG. 2 to form a single common laser beam path 54. The partial segment 56, which connects the two planes to one another stands perpendicular to the central planes 27', 28', 29. One mirror 57 is totally reflecting. Coupling out can take place at a mirror 58. Laser beam path 54 can also extend at angles which differ from 90 degrees.

The question of whether separate laser beam paths in the planes are used or not depends upon the practical application. If it is desired to have a single laser beam, which is of appropriately greater power, then use is made of the configuration according to FIG. 6. However, were it necessary to create two laser beams, then a configuration according to FIG. 5 is suitable; in this case, the two laser beams can extend not only in configurations which are elongate-rectangular, but also in ones which are square, equilateral-triangular, isosceles-triangular, or the like.

Figure 7:
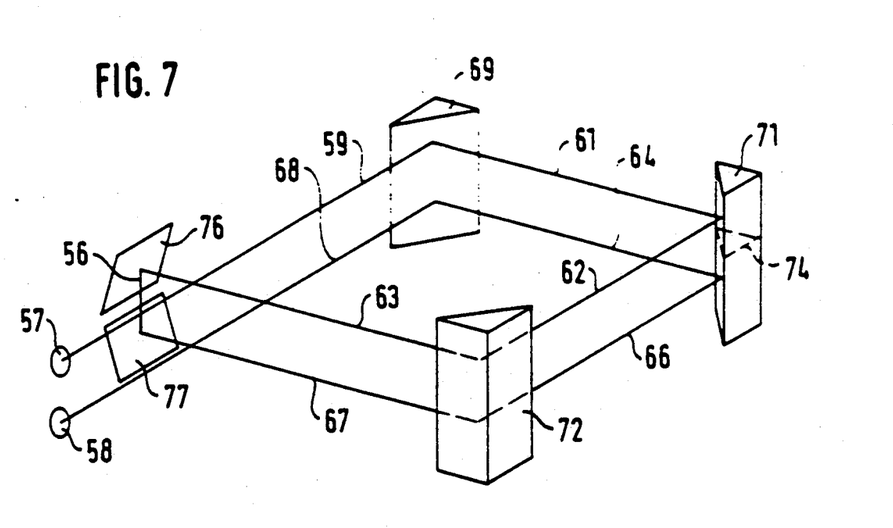
FIG. 7 shows a representation supplementing FIG. 6.

FIG. 7 may facilitate the understanding of what has been stated in conjunction with FIG. 6. In this case, for the sake of clarity, the continuous flanges have not been shown. The partial segments 59, 61, 62, 63 extend in the central plane 27. The partial segments 64, 66, 67, 68 extend in the central plane 28. 90 degree deflecting mirrors 69, 71, 72 deflect the partial segments, as shown, along sides of a square. In an illustrative embodiment, 69, 71 and 72 are integral mirrors which can be adjusted only as a single unit. In the other illustrative embodiment, two separate mirrors are provided in each instance, as represented by the broken separation line 74 symbolically for the 90 degree deflecting mirror 71. In this case, the 90 degree deflecting mirror 71 consists of two separately adjustable partial mirrors, an upper one and a lower one. Mirrors 69, 71, 72 are situated in intermediate corner flanges (not shown). In the end flange, which is likewise not shown, there are situated the mirrors 57 and 58 as well as mirrors 76 and 77 which are inclined symmetrically towards the central plane 29 (FIG. 2) and which reflect the partial segments 63 and 67 and connect these through the connecting segment 56, as is also shown in FIG. 6.

All continuous flanges are at half spacing in relation to the intermediate corner flanges or the associated end flange.

Figure 8:
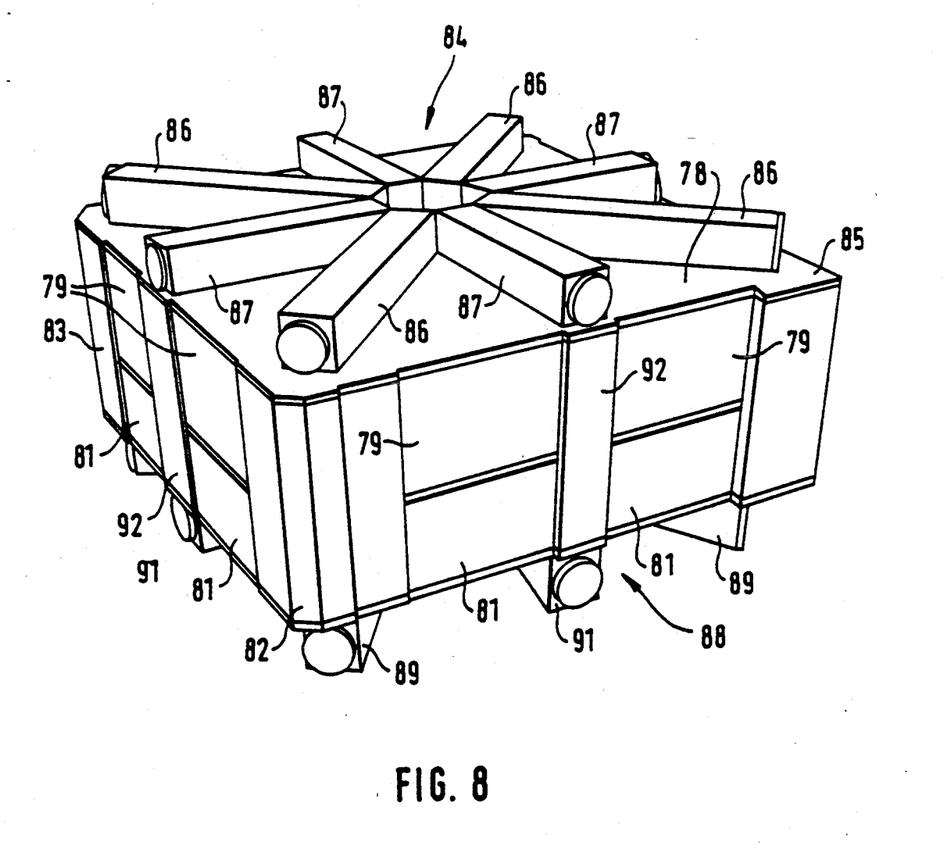
FIG. 8 shows a perspective view of a complete laser.

In a ready-mounted laser, which is ready for operation, according to FIG. 8, it is possible to see a housing 78, which is approximately in the form of a parallelepiped. Upper flaps 79 on the vertical walls are provided, which can be swung upwards, so that it is possible to see the laser beam path situated in the plane 27. Lower flaps 81 are provided directly therebelow, which can be swung downwards about their lower edge, so that the laser beam path which is situated in the plane 28 is found. Of these three intermediate corner flanges it is possible to see two 82 and 83, as well as an end flange 85. Above the top surface of the housing 78 there is provided an upper partial star configuration 84 of connecting lines, which has four inlet lines 86 and four return lines 87. These have the form of rectangular tubes and accommodate coolers (not shown). In the diagonal planes of intersection of this right planar housing 78 there is situated the rotor of a fan. Below the housing 78, seen from above, there is provided in synchronism a second partial star configuration 88, of which inlet lines 89 and return line 91 are in part visible. The inlet lines 89 supply the intermediate corner flanges 82, 83 etc. and the end flange 85. The return lines 87 are connected to the continuous flanges 92. The flanges are rigid constructional units. However, they have covers which can be unscrewed, adjusting devices for the mirrors, mountings for the gas pipes, but their basic structure is a one-piece block. By means of a recess for the partial segment 56 (FIG. 6) it is possible to effect a gas balance from the plane 27 to the plane 28, through the plane 29. According to an illustrative embodiment (not shown), a gas tight separation is present in the plane 29, in the end flange as well, where the configuration according to FIG. 5 is present.

Figure 9:
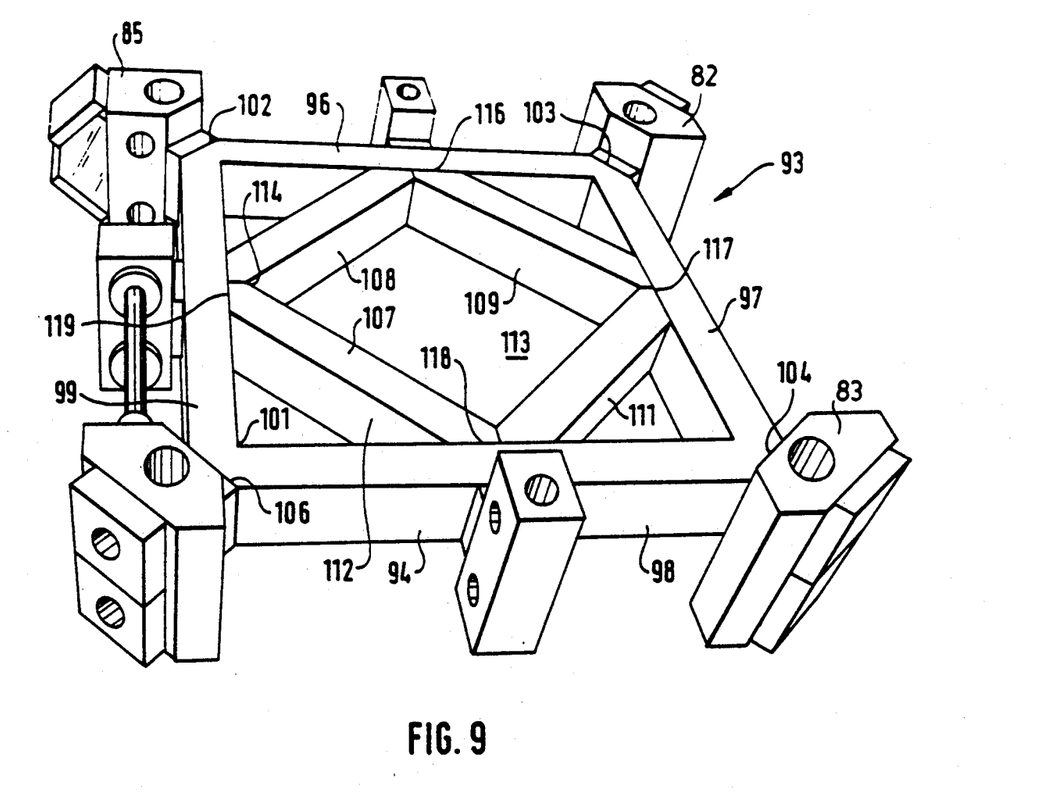
FIG. 9 shows a perspective view of a carrying structure.

FIG. 9 shows a part of the internal structure of the device according to FIG. 8. For orientation purposes, the end flange 85 which is also visible in FIG. 8 is designated in this case. Information on the basic structure of such end flanges can be found, for example, in U.S. Pat. No. 4,878,227, the disclosure of which is incorporated herein by reference.

Intermediate flanges are also explained therein. FIG. 9 shows a carrying structure 93 which is constructed according to the principle of rods in the form of a framework. This carrying structure is upwardly and downwardly symmetrical in relation to the central plane 29 (FIG. 2). The carrying structure is hollow and is cooled by water. Its external size is approximately 90×90 cm. A substantially square outer frame 94 comprises four mutually perpendicular frame limbs 96, 97, 98 and 99. All its internal angles 101 amount to 90 degrees, and the outwardly mutually opposite external corners 102, 103, 104 and 106 are flattened off at 45 degrees (see also FIG. 14). An inner frame 107 consisting of rectangular tubes of the same cross-section is welded into the outer frame 94. The materials of the outer frame 94 and of the inner frame 107 are the same. The two frames are also of equal height and their top and bottom surfaces are in alignment in terms of height and are also parallel to the plane 29. The other outer surfaces of the outer frame 94 and of the Inner frame 107 stand perpendicular to the central plane 29, as is also shown in FIG. 15. The inner frame 107 comprises frame limbs 108, 109, 111, 112, which together again form an—albeit smaller—square and on the inside leave a free space 113 of square shape. In this case also, the internal corners 114 are at right angles, and in this case also the outer corners 116, 117, 118 and 119 are bevelled off at 45 degrees and welded rigidly onto the internal surface of the frame limbs 96 to 99, and specifically at half their length, which is synonymous with "opposite the continuous flanges."

Figure 10:
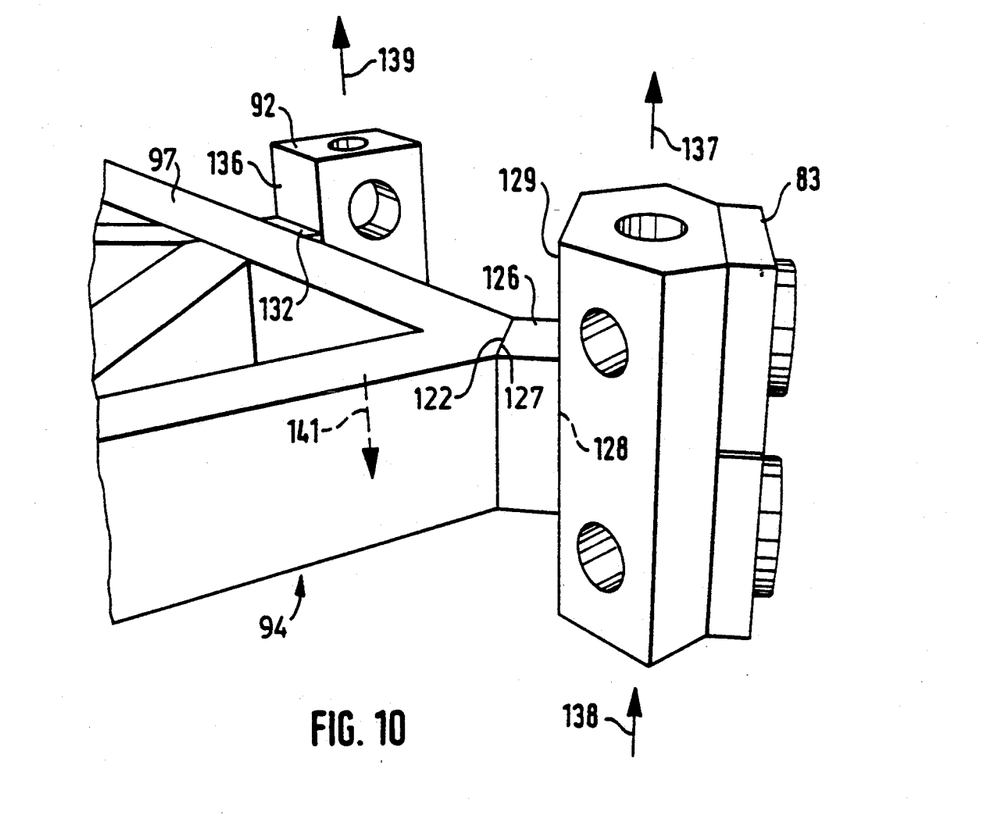
FIG. 10 shows a perspective view of the righthand front corner region of FIG. 9, FIG. 11, shows a plan view appertaining to FIG. 9, but diagrammatically simplified.
Figure 11:
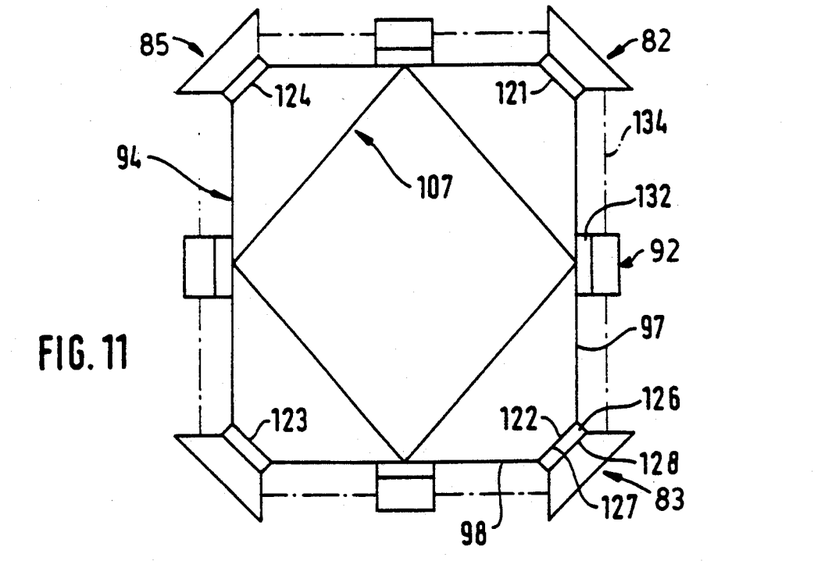

The basis for fastenings of any type in and on this framework is formed according to FIGS. 10, 11 by large-size chamfers, 12/, 122, 123, 124, the cross-sectional area of which according to external corners 102, 103, 104, 106 (FIG. 9) is in the order of magnitude of the cross-sectional area of the frame limbs. Without any interposed components, there is welded onto the outer chamfers 121, 122, 123, 124 in each instance a solid metal plate, which will be explained with reference to the metal plate 126 which is clearly visible, in particular, in FIG. 10. It stands perpendicular to the plane 29, is of the same height as the outer frame 94, and has a base surface 127 which is as large as the surface of the chamfers 122 at the outer corner 104 of the frame limbs 97 and 98. The base surface 127 stands perpendicular to the central plane 29. The metal plate 126 has the form of a parallelepiped. Its outer surface 128, which cannot be seen in FIG. 10 because of the intermediate corner flange 83, is accurately machined and stands perpendicular to the central plane 29. The intermediate corner flange 83, the internal surface 129 of which is likewise accurately machined, is screwed against the outer surface 128.

For the continuous flange 92 (FIGS. 10 and 11) there is likewise provided a metal plate 132, which is externally welded on the frame limb 97 at half its length. Its outer surface stands perpendicular to the central plane 29 and extends parallel to the associated laser segment 134, to which the outer surface 128 of metal plate 126 runs at 45 degrees. A likewise accurately machined internal surface 136 of the continuous flange 92 corresponds to the outer surface so that this flange also extends perpendicular to the plane 29. Similar considerations apply to the other continuous flanges.

Figure 12:
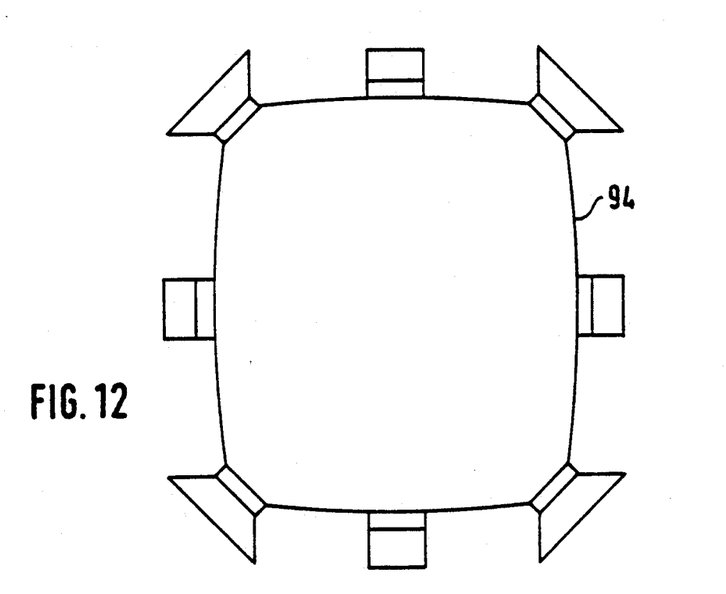
FIG. 12, shows a plan view of FIG. 11, with further simplification, showing rods of the carrying structure which exhibit deformations of exaggerated magnitude.
Figure 13:
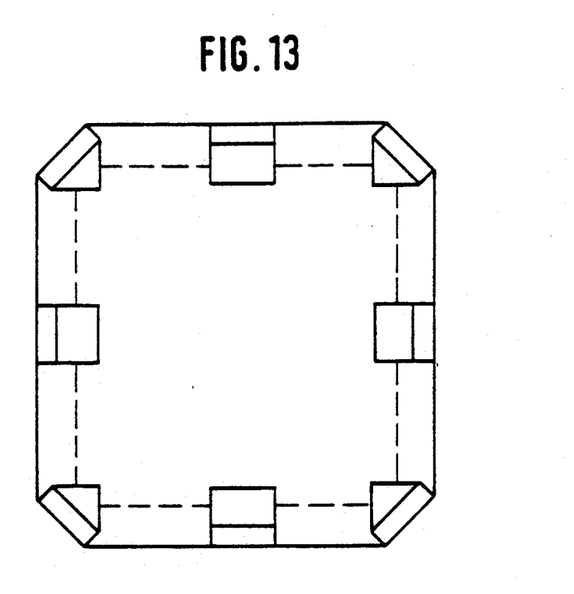
FIG. 13, shows a view similar to FIG. 11, but with internally arranged flanges.

An advantage of this design can be seen in FIG. 12. In this casegreatly exaggerated, of course—the outer frame 94 is drawn as if it were inflated in the manner of a balloon. All metal plates 126 and 132 are not marked in this case. It is, however, seen that the end flange, the continuous flanges and the intermediate corner flanges actually remain in the first instance perpendicular to the plane 29. Their angular position in relation to one another is also maintained.

According to FIG. 10, cooled gas is supplied to the intermediate corner flange 83 according to the arrow 137 for the upper laser beam path and according to the arrow 138 for the lower laser beam path. In a similar manner, this also applies to the other intermediate corner flanges and the end flange. Hot gas is led away from the continuous flange 92 according to the arrow 139 upwards and according to the arrow 141 gas is led away downwards. Each laser beam path situated in the plane 27 and 28 has its own gas supply.

Figure 14:
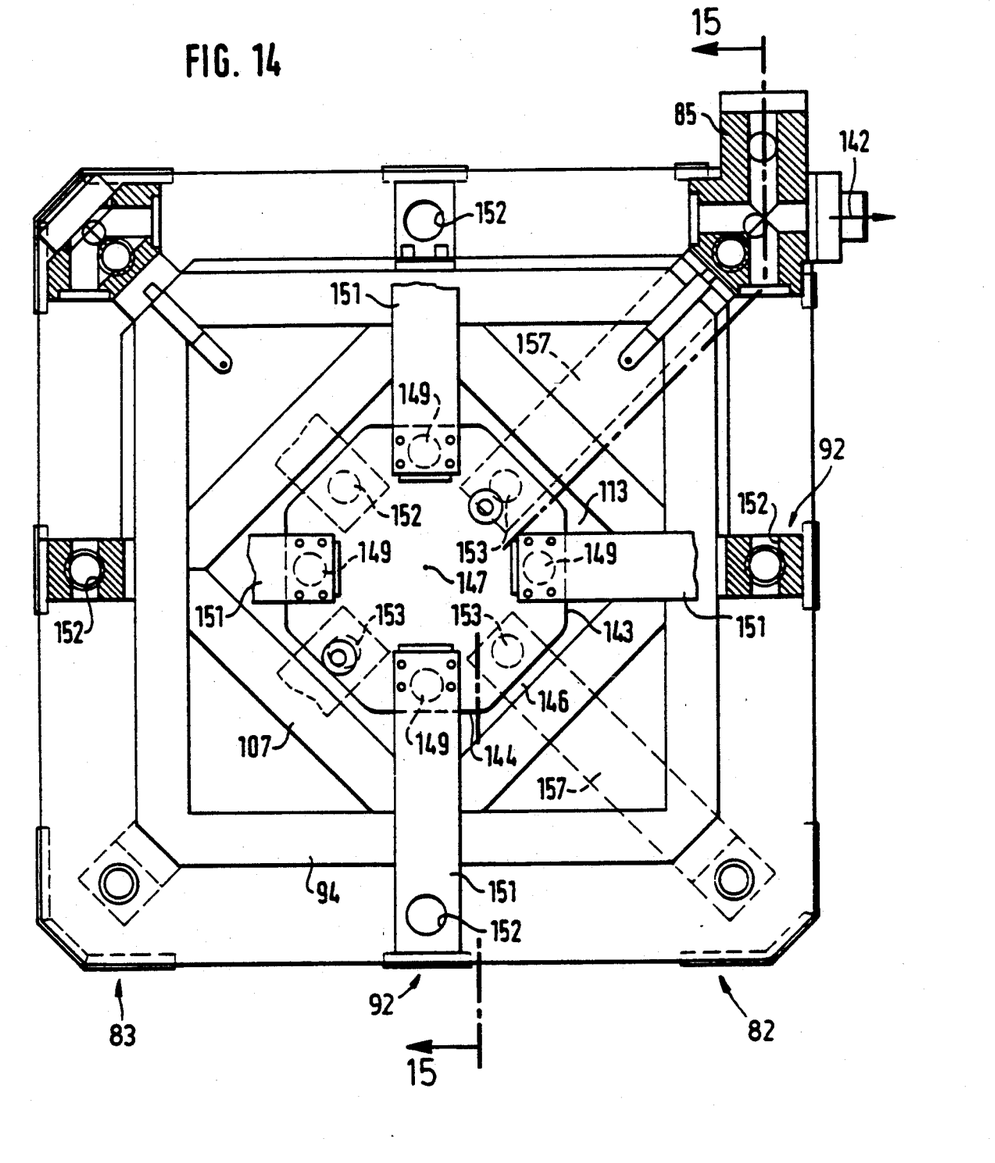
FIG. 14, shows a view similar to FIG. 11, but of a design-drawing type.
Figure 15:
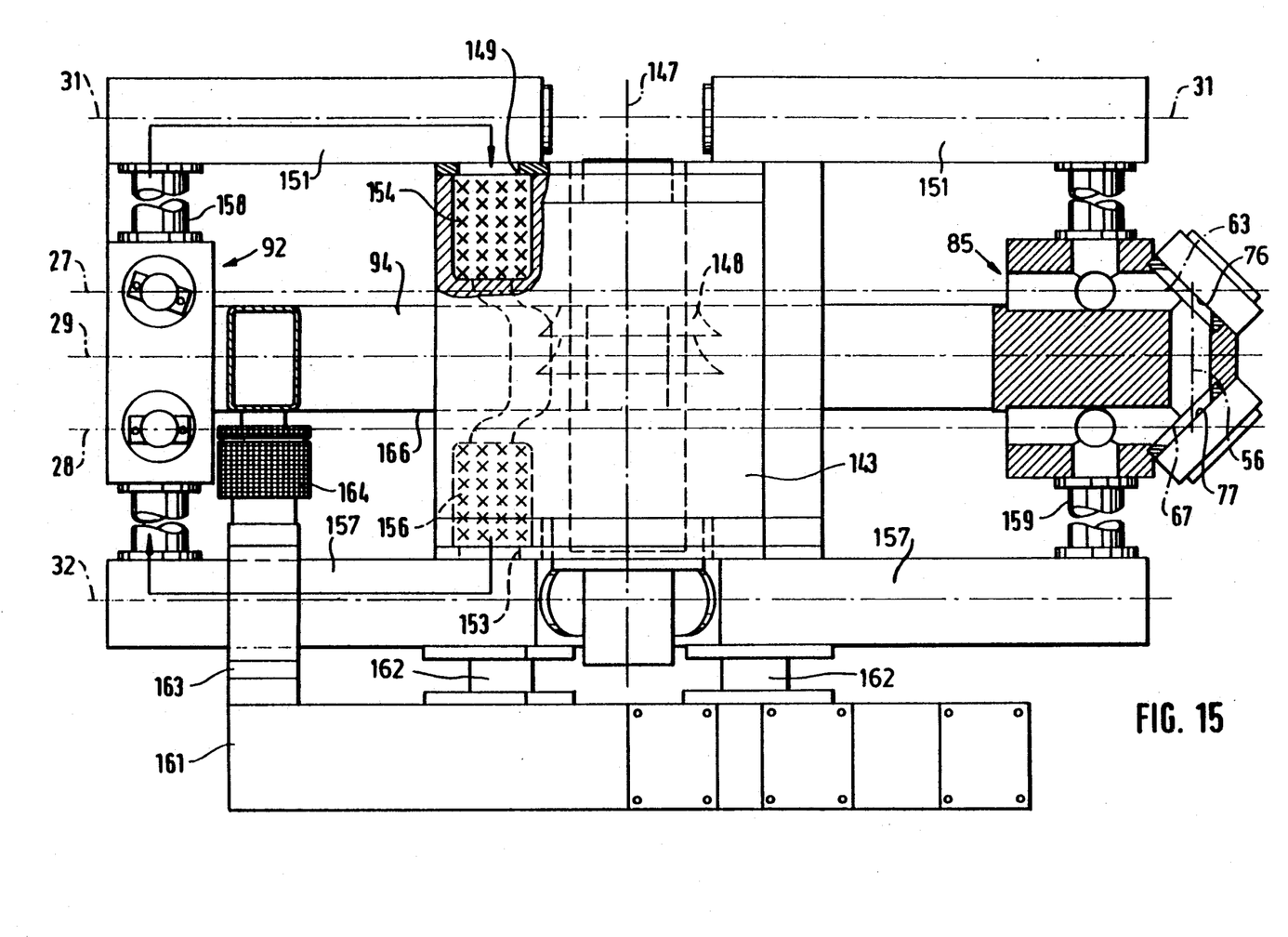
FIG. 15, shows a vertical cross-section along cross line 15—15 of FIG. 14.

FIG. 14 shows an arrangement which is in principle of the same type as FIGS. 6 and 7 and FIG. 9. The end flange 85 can be seen. A laser beam 142 departs from this. In the free space 113, which is actually square, there is centrally situated an axial compressor 143 (FIG. 15). It has an octagonal outline 144, so that every second outer surface is parallel to the opposite internal surface of the frame limbs 108, 109, 111, 112, (FIG. 9) of the inner frame 107. However, there is in all cases a spacing 146, so that no contact ever takes place. The geometric central axis is 147, about which the blades 148 of the rotor (FIG. 15) rotate (on a physical shaft, of course) stands perpendicular to the central plane 29 and corresponds, in the configurations of FIGS. 1 or 4, to the point of intersection 26. With the exception of the end flange 85, the device may to a large extent be reflected at the geometric central axis 147; this does not apply to the end flange 85, just for the reason that it has according to FIG. 7 the mirrors 57, 58 in addition to the mirrors 76, 77. In contrast to the fan used in FIG. 8, the axial compressor 143 blows only towards one side and sucks only towards the other side. Suction takes place through the upper holes 149 (see also FIG. 15). There are four return lines 151, in the plane 31, which communicate with holes 152, at the upper surface of the continuous flanges 92. In this case, the gas both from the lower and also from the upper laser beam path is sucked away. Accordingly, the continuous flanges conduct gas through in an upward direction. The axial compressor 143 has lower holes 153. Cooled gas flows out from these holes 153 via inlet lines 157 to the intermediate corner flanges 82, 83 and to the end flange 85. The inlet lines 157 form a four-jet star on the lower surface of the housing and extend to the corners. They are situated in the fifth geometric central plane 32. At least the return lines 151 and optionally also the inlet lines 157 contain further heat exchangers 154, 156 (FIG. 15).

According to FIG. 15, top left, a flexible hose 158 is provided for the gas outlet line from the continuous flange 92 to the return line 151, so that this flange and in the same way also the other continuous flanges are mechanically decoupled in this respect. In the same manner, a flexible hose 159 decouples the end flange 85 and in a similar manner the intermediate corner flanges from the respective inlet line 157.

According to FIG. 15, the entire system stands on a solid frame 161. It carries, on the one hand, the axial compressor 143, which stand on the frame 161 by means of at least three oscillation damping blocks 162. Moreover, three columns 163 project upwards from the frame 61, which columns do not contact anything of the entire structure, have adjusting elements 164 in their upper region and on which the lower surface 166 of the outer frame 94 stands up three positions, which are angularly spaced from one another by approximately 120 degrees. For the sake of clarity, only one column 163 has been shown. FIG. 15 shows the edgewise box design of the frame limbs of the outer frame 94. The inner frame 107 is not shown in FIG. 15. In this case also, the frame limbs have the same box design. In order to link up better with what was stated in the introductory portion of this text, FIG. 15 also shows the planes 31, 27, 29, 28 and 32 in outline form. The glass tubes between the flanges in which the laser beam proceeds and the gas flows have not been shown. They are of the known technology.

The laser according to FIG. 14 and FIG. 15, as well as the laser according to FIG. 8, has a clear square dimension of 1170 mm and—without the frame 161—an overall height of approximately 650 mm. The laser beam 142 may have a power of 5 kW. This indicates how a relatively large quantity of energy may be generated in such a small space. This principle certainly also brings the advantages in the case of laser beams 142 at least in the range from 500 W to 50 kW. The frames or parts thereof may also consist of a heat-resistant ceramic such as, for example, CERODUR. The same applies to other parts which must be heat-resistant. Furthermore, all other heat-resistant materials may be used. The invention is not restricted to metallic or substantially metallic materials.

Where intermediate corner flanges and end flanges have been mentioned in the description, the object of the measures is not aimed at these as such. Rather, such object is aimed at the optical components, such as mirrors etc., contained therein.

We claim:

1. A longitudinal-flow $CO_2$ laser comprising
   a first laser beam path and a second laser beam path, each laser beam path having intermediate corner flanges with deflecting mirrors for folding the laser beam path in at least three partial segments and a respective first and second geometric central plane zone,
   at least one end flange with a totally reflecting mirror and an output mirror, and
   a carrying structure for supporting said corner flanges and said end flange,
   wherein said carrying structure has a third geometric central plane zone disposed between said first and second geometric central plane zones and parallel thereto, so that said carrying structure includes said flanges of said first laser beam path and said second laser beam path.

2. A laser according to claim 1, wherein each of said first and second laser beam paths has a separate totally reflecting mirror and an output mirror for decoupling two separate laser beams.

3. A laser according to claim 1, wherein said first and second laser beam paths have a common end flange and are serially coupled by a mirror arrangement having mirrors which create a connecting path segment that runs transversely to said third central plane zone within said common end flange for decoupling one common laser beam.

4. A laser according to claim 1, wherein said first and second laser beam paths are congruent when seen perpendicularly with respect to said third central plane zone.

5. A laser according to claim 1, further comprising continuous flanges that are crossed by said partial segments oi said first and second laser beam paths, wherein each of said end flange said continuous flanges, and/or said intermediate corner flanges of said first beam path have a common housing with a respective flange of said second beam path.

6. A laser according to claim 1, wherein said first and second laser beam paths are folded in the form of a quadrilateral.

7. A laser according to claim 1, wherein said first and second laser beam paths are folded in the form of a triangle.

8. A laser according to claim 1 wherein said first and second laser beam paths have a geometric center of gravity, further comprising a fan device including a rotor device having an axis that extends centrally in relation to said first and second laser beam paths through said geometric center of gravity.

9. A laser according to claim 8, wherein said fan device comprises a single common pump for said first and second laser beam paths.

10. A laser according to claim 8, wherein said ian device comprises two separate pumps, one for each of said first and second laser beam paths.

11. A laser according to claim 8, further comprising spring elements that substantially decouple said fan device with respect to vibrations from said carrying structure.

12. A laser according to claim 8, wherein said fan device is connected to said flanges by inlet lines and return lines disposed in a star configuration, said star configuration comprises two partial stars that are each situated parallel to said third geometric central plane zone, and said two partial stars are disposed substantially symmetrically in relation to said third geometric central plane zone.

13. A laser according to claim 12, wherein said two partial stars are substantially identical in design.

14. A laser according to claim 1, wherein said carrying structure comprises rods that are situated symmetrically in relation to said third central plane zone.

15. A laser according to claim 14, wherein said rods have a rectangular hollow cross-section.

16. A laser according to claim 14, wherein said rods form a substantially quadrilateral frame.

17. A laser according to claim 16, further comprising bracings fitted in said quadrilateral frame wherein an inner square frame is inscribed, the outer vertices of which are fused with respective rods at their center.

18. A laser according to claim 11, further comprising a fan device, wherein said inner square frame provides an internal space for said fan device.

19. A laser according to claim 1, wherein said carrying structure comprises rods forming a quadrilateral frame having an outer peripheral surface, said flanges being fixed to said outer peripheral surface of said frame.

20. A laser according to claim 19 wherein at least some of said flanges are rigidly secured to solid metal plates having external and internal opposing surfaces that stand perpendicular to said third central plane zone and are rigidly connected to said frame.

21. A laser according to claim 1, wherein said carrying structure comprises rods forming a quadrilateral frame having an internal surface, said flanges being fixed to said internal surface of said frame.

* * * * *